United States Patent
Schilling et al.

(10) Patent No.: US 7,619,014 B2
(45) Date of Patent: Nov. 17, 2009

(54) RIGID POLYURETHANE FOAMS FOR INSULATION AND PROCESS FOR PRODUCING SAME

(75) Inventors: Steven L. Schilling, Pittsburgh, PA (US); Edward E. Ball, Weirton, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1633 days.

(21) Appl. No.: 10/154,028

(22) Filed: May 23, 2002

(65) Prior Publication Data

US 2003/0220409 A1 Nov. 27, 2003

(51) Int. Cl.
*C08G 18/28* (2006.01)
(52) U.S. Cl. .................... 521/117; 521/130; 521/131; 521/174
(58) Field of Classification Search ................ 521/117, 521/130, 131, 174, 137
See application file for complete search history.

(56) References Cited

U.S. PATENT DOCUMENTS

| | | | |
|---|---|---|---|
| 3,215,652 A | 11/1965 | Kaplan | |
| 5,189,068 A * | 2/1993 | Boehme et al. | 521/51 |
| 5,439,947 A | 8/1995 | Bartlett et al. | 521/131 |
| 5,539,006 A | 7/1996 | Doerge et al. | 521/98 |
| 5,624,969 A | 4/1997 | Seifert et al. | 521/117 |
| 5,654,344 A * | 8/1997 | Falke et al. | 521/49 |
| 5,786,400 A | 7/1998 | Brock et al. | 521/117 |
| 5,889,067 A | 3/1999 | Jang et al. | 521/117 |
| 6,245,826 B1 | 6/2001 | Wilson et al. | 521/174 |
| 2002/0020827 A1 | 2/2002 | Munzenberger et al. | 252/3 |

FOREIGN PATENT DOCUMENTS

GB 2325468 11/1998

* cited by examiner

*Primary Examiner*—John Cooney
(74) *Attorney, Agent, or Firm*—Noland J. Cheung; Lyndanne M. Whalen; John E. Mrozinski, Jr.

(57) ABSTRACT

A rigid polyurethane foam having lose density without an increased k-factor can be produced by adding small amounts of butyl alcohol to a polyurethane composition containing an isocyanate, at least one polyol, a catalyst and a gaseous blowing agent.

30 Claims, No Drawings

RIGID POLYURETHANE FOAMS FOR INSULATION AND PROCESS FOR PRODUCING SAME

FIELD OF THE INVENTION

The present invention relates to rigid polyurethane foams, blown with gaseous blowing agents that have a reduced density without an increased k-factor and processes for preparing the same. The process includes reacting an isocyanate with a polyol blend containing at least one polyol, a catalyst, a gaseous blowing agent and an alcohol.

BACKGROUND OF THE INVENTION

Rigid polyurethane foams and processes for their production are known. Such foams are typically produced by reacting an isocyanate with an isocyanate-reactive compound, such as a polyol, in the presence of a blowing agent. Blowing agents known in the art include hydrofluoro-carbons (HFC's), hydrocarbons (HC's), hydrochlorofluorocarbons (HCFC's) and chlorofluorocarbons (CFC's). See for example, U.S. Pat. No. 5,786,400, which discloses a process for preparing a rigid polyurethane foam, in which a polyisocyanate containing a benzene ring is used as the organic isocyanate and a polyether polyol is used as the polyol and wherein the blowing agent is a cyclopentane. Similarly, U.S. Pat. No. 5,539,006 discloses rigid foams with improved insulation and physical properties produced by reacting an organic polyisocyanate with a sucrose-based polyether polyol in the presence of a catalyst and a blowing agent selected from hydrogen-containing fluorocarbons (HFC's) and hydrogen containing chlorofluorocarbons (HCFC's). See also, U.S. Pat. Nos. 5,439,947 and 6,245,826.

However, due to environmental concerns, CFC's have been phased-out, and HCFC's will be phased-out in the coming years. Specific hydrofluorocarbons (HFC's), such as 1,1,1,2-tetrafluoroethane (HFC 134a) and 1,1,1,3,3-pentafluoropropane (HFC 245fa), as well as hydrocarbons, such as cyclopentane, have been selected as the next generation of blowing agents by appliance manufacturers. Also, some HCFC's such as chlorodifluoromethane (HCFC 22) and 1-chloro-1,1-difluoromethane (HCFC 142b) are approved for certain foam applications until 2010. Several of these blowing agents are gaseous, having boiling points below 60° F. and may exhibit poor solubility in polyols, resulting in a significant vapor pressure. Low k-factor foams made with these gaseous or low boiling blowing agents are often difficult to process and tend to have a higher than desired density.

SUMMARY OF THE INVENTION

The present invention relates to the production of rigid polyurethane foams having a low density without an increased k-factor.

Additionally, the present invention relates to a process for the production of rigid polyurethane foams characterized by the addition of a small amount of butyl alcohol to the foam forming composition.

Further, the present invention relates to the process to produce low-density rigid polyurethane foams using environmentally acceptable blowing agents.

DETAILED DESCRIPTION OF THE INVENTION

It has been found that adding small amounts of butyl alcohol to a foam forming mixture containing an isocyanate, at least one polyol, a catalyst and a gaseous blowing agent, results in a foam with a lower density and an equivalent or improved k-factor.

Any of the known organic isocyanates may be used in the present invention. Suitable isocyanates include aromatic, aliphatic, and cycloaliphatic polyisocyanates and combinations thereof. Examples of useful isocyanates are: diisocyanates such as, m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, the isomers of hexahydrotoluene diisocyanate, 1,5-naphthylene diisocyanate, 1-methyl-phenyl-2,4-phenyl diisocyanate, 4,4'-diphenylmethane diisocyanate, 2,4'-diphenyl-methane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenyl methane-2,2', 5,5'-tetraisocyanate and the polymethylene polyphenyl polyisocyanates.

An undistilled or a crude polyisocyanate may also be used in making polyurethanes of the present invention. The crude toluene diisocyanate obtained by phosgenating a mixture of toluene diamines and crude polymethylene polyphenyl polyisocyanate obtained by phosgenating crude polymethylene polyphenyl polyamine are examples of suitable crude polyisocyanates. Suitable undistilled or crude polyisocyanates are disclosed in U.S. Pat. No. 3,215,652.

Modified isocyanates, such as prepolymers of toluene diisocyanate and crude polymethylene polyphenyl polyisocyanate can also be used. Preferred polyisocyanates for the production of rigid polyurethanes are methylene-bridged polyphenyl polyisocyanates and prepolymers of methylene-bridged polyphenyl polyisocyanates having an average functionality of from about 1.8 to about 3.5, preferably from about 2.0 to about 3.1 and an NCO content of from about 28 to about 34% by weight, due to their ability to cross link and impart rigidity to the polyurethane foam.

The polyisocyanate is generally used in an amount such that the isocyanate index (i.e., the ratio of equivalents of isocyanate groups to equivalents of isocyanate-reactive groups) is from about 0.9 to about 3.0, preferably from about 1.0 to about 1.5.

Any of the known organic compounds containing at least two isocyanate reactive moieties per molecule may be employed in the present invention. However, the preferred isocyanate reactive compounds are polyols or mixtures of polyols containing at least two isocyanate-reactive hydrogen atoms and having an average hydroxyl number of from about 200 to about 650, preferably from about 300 to about 500.

Polyether polyols are among the preferred polyols. Polyether polyols can be prepared by reacting suitable starters with propylene and/or ethylene oxide. The preferred polyethers have number average functionalities of between 3 and 7 and average equivalent weights between about 70 and 300. Suitable starters for preparing such polyether polyols include sucrose, sorbitol, glycerine, ethylene diamine, toluene diamines or alkanol amines. Examples of such polyether polyols include those commercially available under the product name Multranol® (available from Bayer Corporation).

Polyester polyols can also be used in the present invention. Preferred polyester polyols have a nominal functionality of about 2 and equivalent weights between about 120 and 380. Examples of such polyester polyols include those commercially available under the product name Stepanpol® (available from Stepan Corporation) and Terate (available from KoSa).

One or more catalysts for the reaction of the polyol and water with the polyisocyanate are advantageously used. Any suitable urethane catalyst may be used and include known tertiary amine and organometallic compounds.

Examples of suitable tertiary amine catalysts include triethylenediamine, N-methylmorpholine, pentamethyldiethylenetriamine, dimethylcyclohexylamine, tetramethyl ethylenediamine, 1-methyl-4-dimethylaminoethyl-piperazine, 3-methoxy-N-dimethyl -propyl amine, N-ethylmorpholine, diethylethanolamine, N,N-dimethyl-N',N'-dimethyl isopropyl-propylene diamine, N,N-diethyl-3-diethyl aminopropyl amine and dimethyl-benzyl amine. Examples of suitable organometallic compounds include dibutyltin dilaurate, dibutyltin diacetate, stannous octoate, potassium octoate and potassium acetate.

Such catalysts are used in an amount, which measurably increases the rate of reaction of the polyisocyanate. Typical amounts are from about 0.01 to about 3 part of catalyst per 100 parts by weight of the polyol blend Generally the polyol blend includes the polyol, the catalyst, the blowing agent, and other known additives.

When preparing polyurethane-based foams, it is generally advantageous to employ a minor amount of a surfactant to stabilize the foaming reaction mixture until it obtains rigidity. Such surfactants advantageously comprise a organosilicon compound such as polysiloxane-polyalkyene-blockcopolymers. Other, less preferred surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. Typically, about 0.2 to about 5.0 parts of the surfactant per 100 parts per weight of the polyol blend are sufficient for this purpose.

Water can also be included in the foam forming mixture. When water is included, it is generally included in the polyol blend in an amount of greater than 0.2% by weight, preferably from 0.5 to about 3.0% by weight, and most preferably from 1.0 to 2.0% by weight, based upon the total weight of the foam forming mixture (mixture of the polyol blend and the isocyanate). Generally, one molecule of water reacts with two isocyanate groups to form a urea and carbon dioxide gas.

The blowing agents useful in the foam forming mixture of the present invention are selected from the group of low boiling hydrocarbons, hydrofluorocarbons and hydrochloroflurocarbons having boiling points below 60° F.

Suitable hydrocarbons include butane and isobutane. Suitable hydroflurocarbons include difluoromethane (HFC 32), 1,1,1,2-tetrafluoroethane (HFC 134a), 1,1,2,2-tetrafluoroethane (HFC 134), 1,1-difluoroethane (HFC 152a), trifluoromethane (HFC 23), heptafluoropropane, 1,1,1-tri-fluoroethane (HFC 143a), 1,1,2-trifluoroethane (HFC 143), 1,1,1,2,2-pentafluoropropane (HFC 245cb), 1,1,3,3-pentafluoropropane (HFC 245fa), 1,1,1,3-tetrafluoropropane, 1,1,2,3,3-pentafluoropropane, or 1,1,1,2,3,3,3-heptafluoropropane (HFC 227ea).

Suitable hydrochlorofluorocarbons include chlorodifluoromethane (HCFC 22), 1chloro-1,1-difluoroethane (HCFC 142b), and 1-chloro-1,2,2,2,-tetrafluoroethane (HCFC 124).

The blowing agent included in the foam forming mixture is generally included in an amount of about 5 to about 20%, based upon the total weight of the foam forming mixture. The blowing agent is generally included in the polyol blend.

The foam forming mixture of the present invention further includes a butyl alcohol, such as n-butyl alcohol, sec-butyl, or tert-butyl alcohol. The alcohol facilitates the incorporation of the blowing agent into the polyol composition. This reduces the vapor pressure of the blowing agent and facilitates the production of low-density rigid foams that have an equivalent or an improved k-factor. The alcohol is included in the foam forming mixture in an amount of about 0.5 to about 3%, based upon the total weight of the foam forming mixture. Generally, the alcohol is included in the polyol blend.

The components described may be employed to produce rigid polyurethane and polyurethane-modified isocyanurate foam. The isocyanate-reactive compound or mixture having an average OH value of from about 200 to about 650 is reacted with an organic polyisocyanate in the presence of blowing agent, butyl alcohol, catalyst, surfactant, and optionally, additives, fillers, etc. The rigid foams of the present invention may be made in a one-shot process by reacting all of the ingredients together at once, or foams can be made by the so-called quasi-prepolymer method. In the one-shot process where foaming is carried out using foam machines, the active hydrogen-containing compounds, catalyst, surfactants, blowing agents, butyl alcohol and optional additives may be introduced separately to the mixing head where they are combined with the polyisocyanate to give the polyurethane-forming mixture. The mixture may be poured or injected into a suitable container or molded as required. For use of machines with a limited number of component lines into the mixing head, a premix of all the components except the polyisocyanate can be advantageously employed. This simplifies the metering and mixing of the reacting components to form the polyurethane-forming mixture.

Alternatively, the foams may be prepared by the so-called "quasi prepolymer" method. In this method, a portion of the polyol component is reacted in the absence of catalysts with the polyisocyanate component in proportion so as to provide from about 10 percent to about 30 percent of free isocyanate groups in the reaction product based on the prepolymer. To prepare foam, the remaining portion of the polyol is added and the components are allowed to react together in the presence of catalysts and other appropriate additives such as blowing agent, butyl alcohol, surfactant, etc. Other additives may be added to either the isocyanate prepolymer or remaining polyol or both prior to the mixing of the components, whereby at the end of the reaction, a rigid polyurethane foam is provided.

The polyurethane foams of the present invention show a density reduction of more than 2% and have a thermal conductivity at 75° F. in the range of 0.120 to about 0.160 BTU-in/hr-ft$^2$-F.° and are useful in a wide range of insulation applications. Accordingly, not only can rigid appliance foam be prepared but also spray insulation, rigid insulating board stock, laminates and many other types of rigid foam can easily be prepared with the process of this invention.

Having thus described the invention, the following Examples are given as being illustrative thereof. All parts and percentages given in these Examples are parts by weight and percentages by weight, unless otherwise indicated.

EXAMPLES

The materials used in the Examples given below were as follows:

| | |
|---|---|
| POLYOL A: | A sucrose-based polyether polyol, which is commercially available under the tradename Multranol ® 4030 from Bayer Corporation. This polyol has an OH number of about 380 mg KOH/g. |

-continued

| | |
|---|---|
| POLYOL B: | A sucrose-amine-based polyether polyol, which is commercially available under the tradename Multranol ® 9172 from Bayer Corporation. This polyol has an OH number of about 510 mg KOH/g. |
| POLYOL C: | An amine-based polyether polyol, which is commercially available under the tradename Multranol ® 9170 from Bayer. This polyol has an OH number of about 350 mg KOH/g. |
| SURFACTANT A: | A polysiloxane-polyether-copolymer commercially available from Goldschmidt Chemical Corporation under the tradename Tegostab ® B-8465. |
| CATALYST A: | A tertiary amine catalyst, commercially available from Air Products and Chemicals, Inc. under the tradename Polycat ®-8. |
| CATALYST B: | A tertiary amine catalyst, commercially available from Rhein Chemie under the tradename Desmorapid ® PV. |
| ALCOHOL A: | tert-Butyl alcohol. |
| ALCOHOL B: | n-Butyl alcohol. |
| HFC 134a: | 1,1,1,2-Tetrafluoroethane. |
| ISO A: | Mondur MR ® isocyanate, a polymethylene polyphenyl polyisocyanate that is commercially available from Bayer Corporation having an isocyanate content of about 31.5%. |

Polyols, surfactant, catalysts, alcohol, blowing agent and isocyanate were combined and reacted in the amounts indicated in Table 1. All foams were prepared using a high-pressure foam machine equipped with a Hennecke MQ 12-2 mixhead. The liquid output was maintained at a constant 60 lbs./min. and the recycle and pour pressures were held at 1500 psig. The minimum fill density was determined from foam panels poured into a temperature controlled mold with an internal volume of 79 inches (200 cm) by 8 inches (20 cm) by 2 inches (5 cm) at 120° F. See Table 2.

Panels were then prepared at four higher densities of 0.05, 0.10, 0.15 and 0.20 lb./ft$^3$ over the minimum fill density. The top half of each panel was cut into ten sections of about 4 inches (10 cm) and subjected to −4° F. (−20° C.) for at least 16 hours. The panel with the lowest density, which exhibited no significant dimensional change, was considered to be freeze stable. Additional panels for foam properties were all prepared at this "freeze stable density". The properties of the produced foams are reported in Table 3.

TABLE 1

FORMULATIONS USED

| Example | 1 | 2 | 3 |
|---|---|---|---|
| POLYOL A | 40.65 | 40.65 | 40.65 |
| POLYOL B | 18.47 | 18.47 | 18.47 |
| POLYOL C | 14.79 | 14.79 | 14.79 |
| SURFACTANT A | 2.32 | 2.32 | 2.32 |
| CATALYST A | 2.49 | 2.49 | 2.49 |
| CATALYST B | 0.84 | 0.84 | 0.84 |
| ALCOHOL A | — | 1.61 | — |
| ALCOHOL B | — | — | 1.61 |
| WATER (18.0) | 0.86 | 0.86 | 0.86 |
| HFC 134a (102.0) | 19.58 | 19.58 | 19.58 |
| Total Polyol Blend | 100.00 | 101.61 | 101.61 |
| ISO A | 92.8 | 92.8 | 92.8 |

TABLE 2

| Foam Properties | 1 | 2 | 3 |
|---|---|---|---|
| Gel Time(seconds) | 46 | 49 | 43 |
| Min. Fill Density(lb/ft$^3$) | 2.25 | 2.15 | 2.15 |
| Freeze Stable Density (lb/ft$^3$) | 2.31 | 2.24 | 2.20 |

TABLE 3

PROPERTIES OF THE FOAM

| | 1 | 2 | 3 |
|---|---|---|---|
| k-Factor, (BTU-in/hr-ft$^2$-° F. | | | |
| 35° F. Average | 0.127 | 0.126 | 0.126 |
| 75° F. Average | 0.143 | 0.143 | 0.143 |
| Comp. Strength (lb/in$^2$- | | | |
| Perpendicular | 19.0 | 16.4 | 17.4 |
| Parallel | 34.1 | 31.1 | 33.4 |
| Dim. Stability, % Volume Change | | | |
| 1 day at −30° C. | −0.5 | 0.4 | 0.5 |
| 1 week at −30° C. | 0.6 | 0.4 | 0.2 |
| 1 day at +70° C. | 0.9 | 0.7 | −0.1 |
| 1 week at +70° C. | 1.2 | 2.0 | 0.7 |
| Density (lb/ft$^3$) | | | |
| Core Average | 2.17 | 2.06 | 2.02 |
| Closed Cells, (%) | | | |
| % Closed Cells Average | 89.8 | 87.0 | 88.5 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid polyurethane foam prepared by reacting
    a) an organic polyisocyanate,
    b) at least one polyether polyol having a number average functionality of at least three,
    c) a blowing agent with a normal boiling point below 60° F.,
    d) about 0.5 to about 3 wt. % of a butyl alcohol, based upon the total weight of the reaction mixture,
    e) at least one catalyst, and
    f) optionally, a surfactant and water,
wherein the rigid polyurethane foam has a closed cell content of at least 87% closed cells average.

2. A foam according to claim 1, wherein the blowing agent is selected from chlorodifluoromethane (HCFC 22), 1-chloro-1,1-difluoroethane (HCFC 142b), 1-chloro-1,2,2, 2,-tetrafluoroethane (HCFC 124), butane, isobutane, difluoromethane (HFC 32), 1,1,1,2-tetrafluoro-ethane (HFC 134a), 1,1,2,2-tetrafluoroethane (HFC 134), 1,1-difluoro-ethane (HFC 152a), trifluoromethane (HFC 23), 1,1,1-trifluoroethane (HFC 143a), 1,1,2-trifluoroethane (HFC 143), 1,1,1,2, 2-pentafluoro-propane (HFC 245cb), 1,1,1,3,3-pentafluoropropane (HFC 245fa), or 1,1,1,2,3,3,3-heptafluoropropane (HFC 227ea).

3. A foam according to claim 2, wherein the blowing agent is 1,1,1,2-tetrafluoroethane (HFC 134a) or 1,1,1,3,3-pentafluoropropane (HFC 245fa).

4. A foam according to claim 3, wherein the blowing agent is 1,1,1,2-tetrafluoroethane (HFC 134a).

5. A foam according to claim 1, wherein the blowing agent is present in an amount of about 5 to about 20%, based upon the total weight of the foam forming mixture.

6. A foam according to claim 1, wherein the butyl alcohol is t-butyl alcohol.

7. A foam according to claim 1, wherein the butyl alcohol is chosen from t-butyl alcohol, sec-butyl, n-butyl alcohol and mixtures thereof.

8. A foam according to claim 1, wherein the foam has a k factor at 75° F. in the range of from about 0.120 to about 0.160 BTU-in/hr-ft$^2$-° F.

9. A foam according to claim 1, wherein the polyether polyol comprises a sucrose-based polyether polyol.

10. A foam according to claim 1, wherein the polyether polyol comprises an amine-initiated polyether.

11. A foam according to claim 1, wherein the organic polyisocyanate is selected from the group consisting of diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4-diphenylmethane diisocyanate, 2,4-diphenylmethane diisocyanate, 4,4'-biphenylene diisocyanate, 3,3'-dimethoxy-4,4'-biphenylene diisocyanate and 3,3'-dimethyl-diphenylpropane-4,4'-diisocyanate; triisocyanates such as 2,4,6-toluene triisocyanate; and polyisocyanates such as 4,4'-dimethyldiphenylmethane-2,2',5,5'-tetraisocyanate and polymethylene poly-phenylpolyisocyanates or prepolymers or modifications thereof.

12. A foam according to claim 11, wherein the isocyanate is a polymeric methylene diphenyl diisocyanate or a modified polymeric methylene diphenyl diisocyanate.

13. A foam according to claim 1, wherein water is included in the foam forming mixture.

14. A foam according to claim 1, wherein the catalyst comprises one or more tertiary amines.

15. A rigid polyurethane foam prepared by reacting
a) an organic polyisocyanate,
b) at least one polyether polyol having a number average functionality of at least three, which has first been blended with,
  i) a physical blowing agent with a normal boiling point below 60° F.,
  ii) about 0.5 to about 3 wt. % of a butyl alcohol, based upon the total weight of the reaction mixture,
  iii) at least one catalyst, and
  iv) optionally, a surfactant and water,
wherein the rigid polyurethane foam has a closed cell content of at least 87% closed cells average.

16. A process for preparing a rigid polyurethane foam having a low density comprising the step of combining
a) an organic polyisocyanate,
b) at least one polyether polyol having a number average functionality of at least three,
c) a physical blowing agent with a normal boiling point below 60° F.,
d) about 0.5 to about 3 wt. % of a butyl alcohol, based upon the total weight of the reaction mixture,
e) at least one catalyst, and
f) optionally, a surfactant and water,
wherein the rigid polyurethane foam has a closed cell content of at least 87% closed cells average.

17. The process according to claim 16, wherein the blowing agent is selected from chlorodifluoromethane (HCFC 22), 1-chloro-1,1-difluoroethane (HCFC 142b), 1-chloro-1,2,2,2,-tetrafluoroethane (HCFC 124), butane, isobutane, difluoromethane (HFC 32), 1,1,1,2-tetrafluoroethane (HFC 134a), 1,1,2,2-tetrafluoroethane (HFC 134), 1,1-difluoroethane (HFC 152a), trifluoromethane (HFC 23), 1,1,1-trifluoroethane (HFC 143a), 1,1,2-trifluoroethane (HFC 143), 1,1,1,2,2-pentafluoropropane (HFC 245cb), 1,1,1,3,3-pentafluoropropane (HFC 245fa), or 1,1,1,2,3,3,3-heptafluoropropane (HFC 227ea).

18. The process according to claim 17, wherein the blowing agent is 1,1,1,2-tetrafluoroethane (HFC 134a) or 1,1,1,3,3-pentafluoropropane (HFC 245fa).

19. The process according to claim 18, wherein the blowing agent is 1,1,1,2-tetrafluoroethane (HFC 134a).

20. The process according to claim 16, wherein the blowing agent is present in an amount of about 5 to about 20%, based upon the total weight of the reaction mixture.

21. The process according to claim 16, wherein the butyl alcohol is t-butyl alcohol.

22. The process according to claim 21, wherein the butyl alcohol is chosen from t-butyl alcohol, sec-butyl, n-butyl alcohol and mixtures thereof.

23. The process according to claim 16, wherein the rigid polyurethane foam has a k factor at 75° F. in the range of from about 0.120 to about 0.160 BTU-in/hr-ft$^2$-° F.

24. The process according to claim 16, wherein the polyether polyol comprises a sucrose-based polyether polyol.

25. The process according to claim 16, wherein the polyether polyol comprises an amine-initiated polyether.

26. The process according to claim 16, wherein the organic polyisocyanate is selected from the group consisting of diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4-diphenylmethane diisocyanate, 2,4-diphenylmethane diisocyanate, 4,4'-biphenylene diisocyanate, 3,3'-dimethoxy-4,4'-biphenylene diisocyanate and 3,3'-dimethyl-diphenylpropane-4,4'-diisocyanate; triisocyanates such as 2,4,6-toluene triisocyanate; and polyisocyanates such as 4,4'-dimethyldiphenylmethane-2,2,5,5'-tetraisocyanate and polymethylene polyphenylpolyisocyanates or modifications thereof.

27. The process according to claim 16, wherein the isocyanate is a polymeric methylene diphenyl diisocyanate or a modified polymeric methylene diphenyl diisocyanate.

28. The process according to claim 16, wherein water is included in the reaction mixture.

29. The process according to claim 16, wherein the catalyst comprises one or more tertiary amines.

30. The process according to claim 29, wherein the catalyst is selected from the group consisting of triethylenediamine, N-methyl-morpholine, pentamethyldiethylenetriamine, dimethylcyclohexylamine, tetramethyl ethylenediamine, 1-methyl-4-dimethylaminoethyl-piperazine, 3-methoxy-N-dimethyl-propyl amine, N-ethylmorpholine, diethylethanolamine, N,N-dimethyl-N',N'-dimethyl isopropyl-propylene diamine, N,N-diethyl-3-diethyl aminopropyl amine and dimethyl-benzyl amine.

* * * * *